May 3, 1960 C. LORENZEN 2,935,176
FRUIT ORIENTING DEVICE
Original Filed Nov. 19, 1956 2 Sheets-Sheet 2
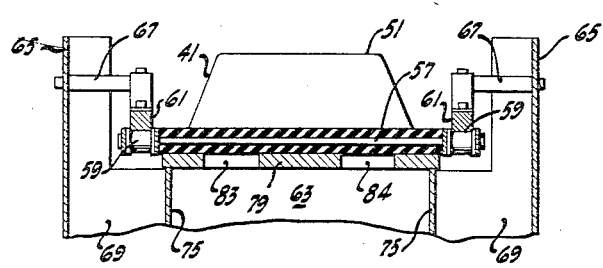
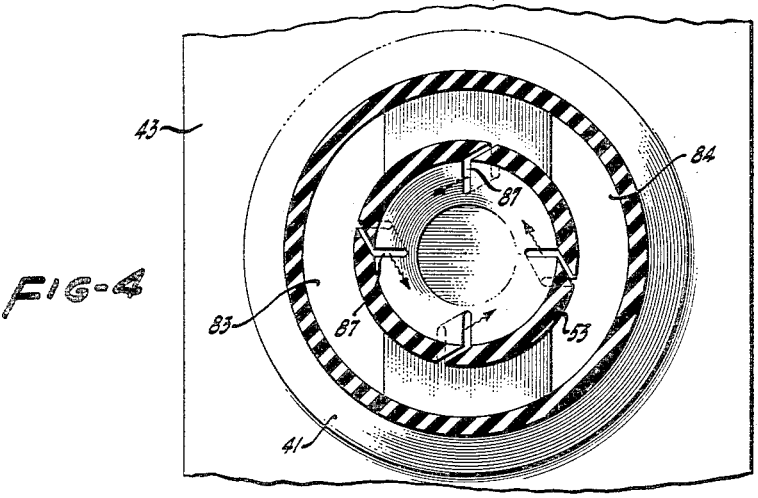
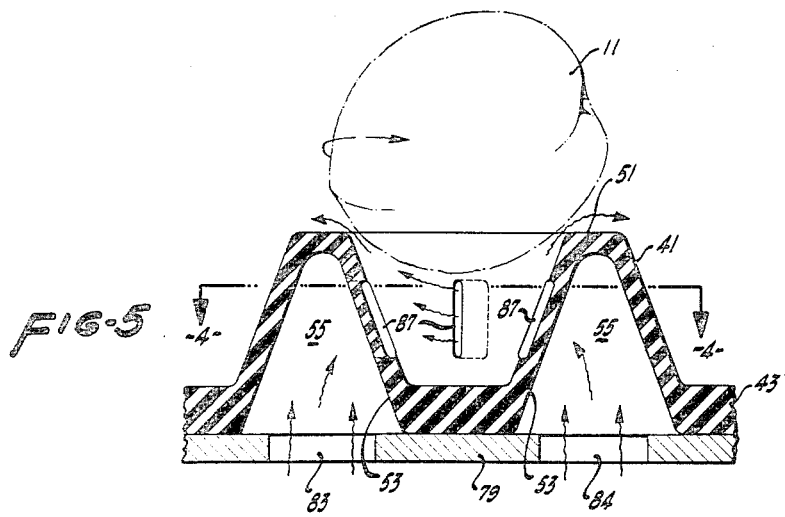
INVENTOR.
COBY LORENZEN
BY
ATTORNEYS

United States Patent Office 2,935,176
Patented May 3, 1960

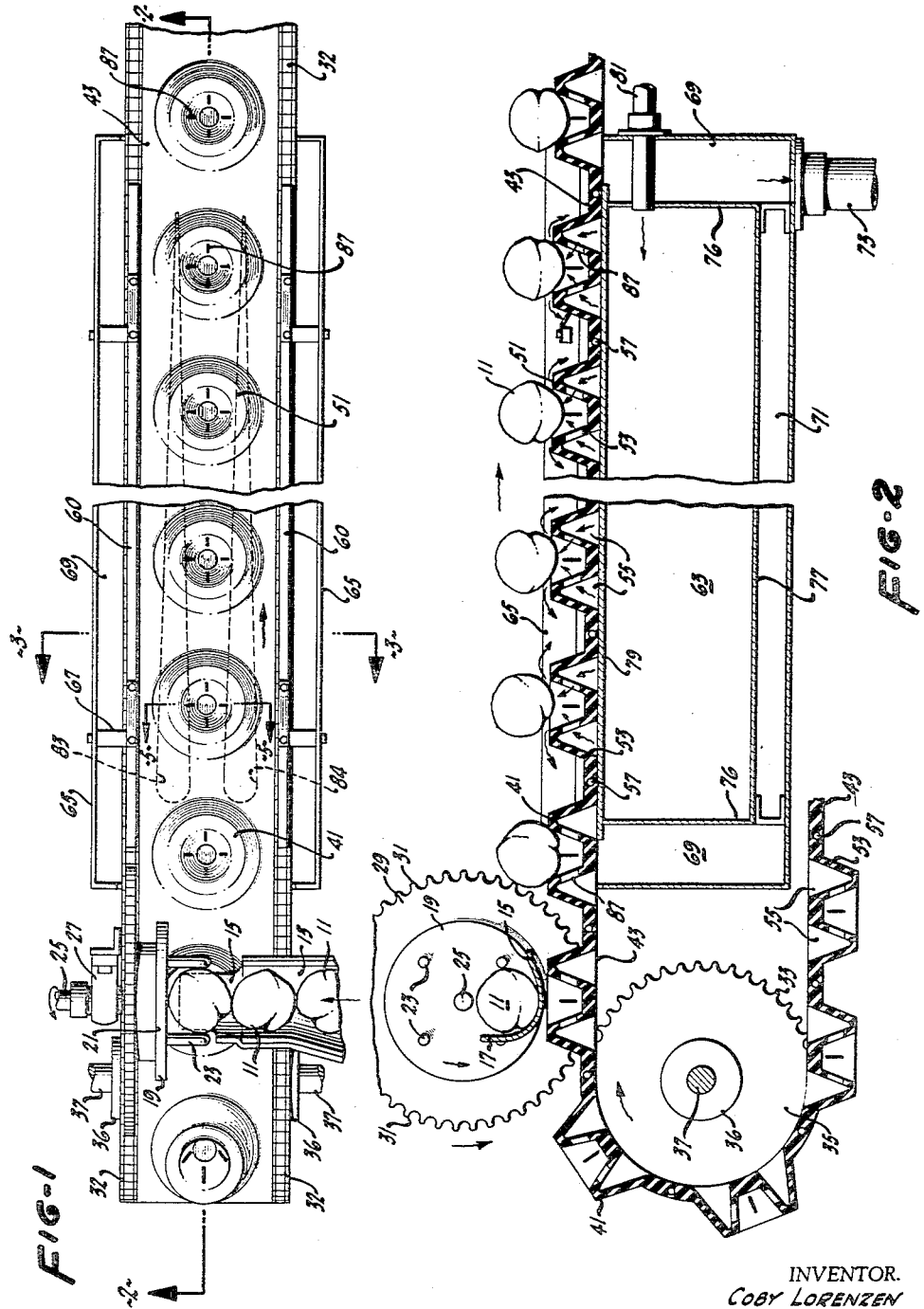

2,935,176

FRUIT ORIENTING DEVICE

Coby Lorenzen, Davis, Calif., assignor to the Regents of the University of California, Berkeley, Calif., a corporation of California Continuation of application Serial No. 623,099, November 19, 1956. This application February 19, 1959, Serial No. 794,461

8 Claims. (Cl. 198—33)

This invention relates to apparatus for orienting fruit or other objects and is concerned particularly with a device to orient drupaceous fruits so that each fruit piece of a sequence is similarly turned preparatory to cutting the fruit to divide the individual pieces into halves for drying. The application constitutes a continuation of application Serial No. 623,099, filed November 19, 1956, now abandoned, by this inventor.

Because of the usual design of cutting devices, size determining components, pit removal units and the like, it is particularly desirable in the fruit industry that the individual fruit pieces which are fed from a supply source to cutting devices shall all be similarly oriented prior to the time the cutting or halving operation occurs. Generally speaking, the largest diameter of a drupe is in the direction of the plane of suture and it is in this plane that the fruit is generally cut for the purpose of making the pit removal from one half or the other easier.

Where the fruit can be readily oriented from indiscriminate initial positioning on a fruit-handling conveyor the loading program can be substantially accelerated if the fruit between the loading and cutting operation can be automatically turned so that its plane of suture is in an optimum relationship relative to the cutting devices. Various ways and means to provide such orientation have already been suggested in the art and while some proposals heretofore made have proved quite satisfactory it is generally found that the orienting mechanisms of the prior art either completely fail or fail to function at maximum efficiency where the fruit pieces approach a spherical form. This is particularly true in the case of an attempt to orient peaches since the peach is generally quite round. The orientation difficulties are less apparent in the case of apricots since the fruit pieces, while of generally spheroid shape, nonetheless depart to some extent from true spherical configuration.

According to the present invention a fruit orienting device has been provided in the general form of a fruit supporting cup having fluid entry ports extending therein which are so slanted that entering fluid is caused to possess a tangential component of motion which provides a generally swirling movement of fluid within the cup. The velocity of swirling is determined for any given size port or slots through which the fluid enters the cup generally by the pressure applied to the fluid which is passed within the cup through such slots from a suitable supply duct means.

Fruit orienting apparatus of the type herein to be described operates so that the individual fruit pieces or other objects to be oriented are generally supported at the outer rim of the cups, and are held thereto only by gravitational forces. The fruit pieces are initially supplied to the cups from a supply source without regard to the direction of the suture. With fluid introduced into the cup through the slots at relatively high pressures a circular or swirling motion of the fluid occurs within the cup and fluid overflow from the cup occurs over the edge of the cup rim upon which fruit or other objects are adapted to rest. When fruit pieces are rested against the rim of the cup and the fluid is caused to flow upwardly through the cup at a sufficient rate a buoyant force is provided to lift the fruit pieces away from their contact with the cup rim, permitting the fluid then to flow outwardly from the cup around the cup rim and between the fruit rim and the fruit piece thereby supported.

In one form of orienting device already in use the cup has an opening on the cup axis and at its bottom so that fluid can flow into the cup from a reservoir (usually directly below the cup) and then flow outwardly over the cup top or rim. When a fruit piece is placed on such a cup with fluid (usually water) flowing upwardly through the cup at sufficient rate a buoyant force is developed to lift the fruit away from contact with the cup wall or rim. Water then flows out of the cup around the fruit.

The velocity of the fluid supplied at any section of the cup wall from the supply duct means will vary with the space between the cup and the fruit or supported object at the particular point. The fluid flow then tends to create a drag on the surface of the supported fruit tending to move the surface in the direction of the fluid. The drag force which is exerted is proportional to the drag coefficient, the density of the fluid, the area of object surface in contact with the moving fluid and the square of the velocity of the fluid with respect to the surface of the supported fruit. Wherever the drag forces around the periphery of the fruit supporting cup are equal, the position of the supported fruit will be maintained. However, for conditions where the drag forces on one side of the supported fruit are greater than those on the opposite side their difference creates a couple tending to turn the supported object until equalization of the drag forces occurs, which condition is established when the greatest diameter of the supported fruit is normal to the axis of the fluid stream, that is, normal to the axis of the jet leaving the cup.

Generally speaking, the largest diameter of any drupaceous fruit, of which an apricot is one example, is in the plane of suture so that under these conditions the supported fruit will be turned within the fluid stream so that the suture plane is horizontal.

In a case where fluid enters into the cup along a tangential path, as will be described by the present invention, a rotary or swirling motion of the fluid is established within the cup and the supported object or fruit is subjected to drag forces, as in the case of an axial flow cup, with the exception that in this case all of the forces occur in the same sense, that is, they all combine to result in a rotation of the object or apricot on or in the cup and produce a spinning motion of the object about a vertical axis which should coincide with the axis of the cup.

When the supported object thus is caused to spin on a vertical axis its mass distribution permits forces to develop which turn the fruit so that its suture plane is horizontal and the greater the eccentricity of the oblate or prolate ellipsoid, into which general classification of geometric solid an apricot may be considered to fall, the greater will be the turning force. The developed centrifugal turning force is proportional to the square of the angular velocity of the fruit or other object about the axis of rotation.

In the case of an axial flow cup only drag forces which are a function of the fruit surface are developed but in the case of a tangential flow cup of the character herein to be described the controlling factor is the mass distribution of the fruit or other object. In the case of drupaceous fruits, such as peaches and apricots, the pit or stone is also an ellipsoid so that with the pit being of higher density than the fruit flesh the forces on the pit contribute also to the orientation.

Under the circumstances there is included among the objects of the invention that of providing an improved arrangement for orienting fruit components by the action of a fluid jet thereon.

Another object of the invention will be found to include those of providing a form of fruit orienting apparatus in which desired orientation is assured even though the components to be oriented approach very closely to an almost precisely spherical form.

Still a further object of the invention is that of providing fruit orienting apparatus in which the fruit may be continuously fed to the apparatus and subsequently continuously discharged therefrom and providing the orientation in the transport mechanism between the loading and discharge points without in any way altering the speed of movement of the transport mechanism component between the two points.

A further object of the invention is to simplify fruit orienting apparatus and at the same time to insure substantially uniform orientation within relatively wide limits of fruit shape, size, weight and surface characteristics.

Other objects and advantages of the invention will become apparent and at once suggest themselves to those skilled in the art to which the invention is directed when the invention is considered in connection with the accompanying drawings showing largely in schematic form a preferred form of the mechanism for carrying out the aims and objects.

By the drawings:

Fig. 1 represents in plan a portion of a conveyor belt having thereon a plurality of fruit supporting cups with the conveyor portion, and a part of the drive mechanism, conventionally shown in the region of fruit loading and fruit orientation;

Fig. 2 is a sectional view of the conveyor apparatus depicted by Fig. 1, with the section taken on the line 2—2 of Fig. 1 looking in the direction of the arrows;

Fig. 3 is also a sectional view taken along the lines 3—3 of Fig. 1 and likewise looking in the direction of the arrows;

Fig. 4 is a section through one of the fruit supporting cups to show the general relationship between the cup and the conveyor belt mechanism, with a view taken along the line 4—4 of Fig. 5; and Fig. 6 is a sectional view through one of the fruit supporting cups taken substantially through the cup center and looking generally in the direction of the arrows on the section designated 5—5 of Fig. 1 but excluding a showing of the fluid supply source.

Referring now to the drawings, and first to Fig. 1, for a further understanding of the invention, individual fruit pieces 11 are fed outwardly along a guide channel 13 in the direction indicated by the arrow. The guide channel 13 is adapted to supply the individual fruit pieces from any suitable supply bin or trough (not shown) and to provide a feed path for the fruit pieces in single-file fashion to the conveyor mechanism. The illustrated form of guide channel (which, per se, is not a part of the present invention) is of elongated and trough-like formation, open at its top and of a width only slightly in excess of the longest diameter of any fruit piece to be moved. This permits the fruit to be rolled or otherwise moved forward in any desired manner in the direction shown by the arrow along the guide, finally to rest upon a fruit ejection platform 15, which, as indicated, is preferably generally flattened with one upturned side shown at 17 (see particularly Fig. 2). After the fruit is moved along the guide channel 13 and finally caused to rest on the fruit ejection platform its motion is finally stopped when it is forced against a disc member 19 of a metering mechanism 21. The disc member 19 is caused to rotate at approximately the end of the fruit ejection platform 15.

As the invention has been illustrated, the metering mechanism 21 by which individual fruit pieces are supplied to a transport mechanism is provided by the indexing pins 23 which project outwardly from the periphery of the disc 19 and face toward fruit ejection platform 15. The disc member 19 and with it the pins 23 is rotated upon a shaft 25 held in suitable bearing members 27 and a suitable framework, the complete driving mechanism for which shaft has not been shown for reasons of simplicity. Movement of the shaft, however, is provided by the gear 29 keyed thereto with the gear having teeth 31 about its periphery.

The gear teeth 31 mesh with the links of a chain 32 formed on the edge of a conveyor belt transport mechanism 43, later to be described. The chain mechanism 32 on the edges of the conveyor 43 is so arranged that the chain wraps over the teeth 33 on a pair of spaced apart gears 35 secured by hub portions 36 to a driving shaft 37 and keyed appropriately thereon to be driven thereby. The pitch of the gear teeth 33 is identical to that of the gear teeth 31 of the gear 29 and also corresponds to (or is a multiple of) the pitch of the chain segments or links 32 so that the driving gears 35 will drive the chain 32 and the therewith connected transport or conveyor belt mechanism. The conveyor belt or transport mechanism 43 has the driving chains 32 secured along each edge. The gear 29, as already pointed out, has the metering disc 19 secured thereto and consequently with rotation of the gear 29 the pins 33 are turned and move across the fruit ejection platform 15. The pins 23 are located on the disc 19 in a position such that upon rotation they pass across the fruit ejection platform 15 in a spaced apart relationship thereto at a point justly slightly below the center of the supported fruit when at the lowermost part of each rotation. The direction of the turning of the pins with respect to the fruit is indicated by the arrow shown in Fig. 2. As the turning pins 23 come to bear upon the various fruit pieces 11 fed in succession to bear against the disc face 19 the force exerted by the pins against the fruit is just sufficient to move the fruit off the platform 15 to rest upon a fruit supporting member in the form of a cup 41 attached to the conveyor belt or transport mechanism 43. The cups 41 on the belt 43 pass directly beneath the platform 15, with the movement of the conveyor while successive cups 41 on the belt 43 move beneath the discharge edge of the platform 15 occurring in the same time that each of the pins 23 rotates through 90°. There is an appropriate coordination between the instantaneous position of the cups 41 relative to the pins whereby one cup of the belt is directly beneath the right hand edge (looking at Figs. 1 and 2) of the fruit ejection platform 15 each time a pin 23 dislodges a fruit piece therefrom to cause it to move over to rest by gravity upon the upper rim of a fruit support cup 41 and thereafter to move therewith.

As the apparatus has been depicted by Fig. 2 the pins 23 are shown to be spaced apart at approximately 90° so that during the time period between which successive cups 41 move beneath the edge of the platform the disc 19 of the metering mechanism and its associated pins will have moved just the precise distance to correspond to the travel of the conveyor belt with respect to the edge of the platform. In the preferred form of operation the belt or transport mechanism 43 is of an endless variety and loops over a suitable drum or pulley at the right hand end looking at Figs. 1 and 2, which arrangement has not been specifically illustrated in the drawings for reasons of convenience. The underside of the conveyor belt then connects to the belt shown broken away at the underside of the showing of Fig. 2.

After fruit pieces 11 are rested upon the rim 51 of the cups 41 they move with the conveyor or transporting mechanism toward the fruit cutting apparatus of any suitable character (not shown). The fruit supporting cups 41 are preferably centered laterally of the conveyor or transport mechanism as well as spaced longitudinally thereon as already explained.

The cups individually have an upwardly extending portion of more or less frusto-conical form (see particularly Figs. 2, 3 and 5) which terminate in the upper supporting rim or ring 51, upon which the fruit pieces are adapted to rest. The interior of each frusto-conical fruit support cup 41 is re-entrant in character, as shown particularly by Figs. 2 and 5 and between the outer wall of the cup 41 and the re-entrant wall 53, a duct or chamber 55 is formed, and this duct surrounds completely the cup. Each of the cups is preferably of some suitable resilient material and may be a rubber or fabric, and thus of a similar material to that of which the belt 43 itself is formed. Under these conditions the cup base may be vulcanized to the belt base, so as to form directly therein, or may even be molded into the belt in its fabrication. When the cups and belt are assembled an annular ring or opening corresponding to the duct size at its bottom is formed in the belt so that fluid from a suitable source, later to be described, can enter into the duct for passage into the cup proper.

The belt has suitable stiffening or support rods 57 extending therethrough and transversely of the length in the region between adjacent fruit support cups 41. Each transverse stiffening rod 57 terminates in a pin 59 to hold the links of the chain together. The guide track member 61 adjacent to the chain in the region of the reservoir or tank supply generally designated 63 tends to hold the belt down. The guide track 61 is held and supported from an outer upturned sidewall 65 by suitable support pins 67 extending outwardly therefrom. The upper edge of the sidewalls 65 surrounding the reservoir or tank 63 extend upwardly to a height which is slightly above the upper rim 51 of the fruit support cups 41, so that fluid passing outwardly through the cup, in a manner later to be explained, can return to a supply source by way of the passage 69 and lower conduit 71 into a drainpipe 73.

The reservoir or fluid supply tank proper is supported within the outer walls 65 and comprises a tank formed with sidewalls 75, end walls 76, a bottom wall 77, and a top covering 79. Fluid is supplied to the tank 63 through an intake pipe 81 and the fluid (usually water, although air or other liquid could be used) within the tank or reservoir is usually maintained at a pressure head in the range between 6 and 20 inches of water.

An elongated opening or slot, here represented by the plurality of slots 83 and 84, is provided in the top covering 79 of the tank or reservoir 63, through which fluid or liquid can be released, as has already been explained. The conveyor or transport mechanism 43 when moved slidably over the top covering 79 of the tank or reservoir is pressed down thereon by the guide rails 61, and to reduce friction between the conveyor and the thereon contained cups 41 a suitable film of grease or the like may be provided. In some instances the mere presence of the ejected fluid or liquid is often adequate to provide suitable lubrication although the fit between the conveyor belt or transport mechanism 43 and the top covering 79 of the tank or reservoir 63 is usually resonably fluid-tight. Consequently, substantial fluid pressure losses within the tank or reservoir 63 do not occur except for the fact that as the conveyor belt or transport mechanism 43 moves in the direction of the arrow relative to the tank or reservoir which is fixedly located, the duct or chamber 55 of the fruit support cup moves over the slots 83 and 84 so that because of the pressure head developed within the tank or reservoir 63 liquid or other fluid contained therein is forced into the ducts 55.

Since it is preferable to have the duct 55 completely surround the re-entrant wall 53 of the cup 41 it will be appreciated that as soon as the duct or chamber 55 is moved above the slot 83 liquid or fluid from the tank or reservoir 63 is forced through the slot into the region of the chamber 55 surrounding the re-entrant cup portion. Egress of the fluid through the cup is provided by way of a plurality of slotted openings 87 formed in the re-entrant inner cup wall. These slotted openings as can be seen particularly by Figs. 1 and 4 are equally spaced around the inner cup wall and they are faced in such manner that fluid flowing therethrough from the duct or chamber 55 passes into the cup along a path substantially tangential to the re-entrant wall of the cup.

Figs. 4 and 5 in particular show the slotted openings 87 extending through the re-entrant wall of the support cup at an angle to the cup axis so that fluid flowing into the cup from the tank or reservoir 63 follows a path generally like that designated schematically by the arrows, particularly on Figs. 4 and 5, and circular motion of the fluid within the re-entrant portion of the cup is provided. The rotational velocity of the fluid motion is governed in accordance with the pressure head under which the fluid enters the cup from the tank or reservoir 63. The force exerted is a product of the pressure and the area and it will be appreciated that, with the slots 83 in the top covering 79 of the tank or reservoir 63 having their greatest width at the point nearest to the loading point of the fruit pieces on the conveyor cups and reducing to a minimal width and finally terminating; after the fruit pieces have moved a relatively short distance by reason of conveyor motion along the tank or reservoir 63, the volume of fluid which can flow through the slots 83 and 84 is very materially reduced. Consequently, with the fluid flowing into the cups through the duct means external to the re-entrant cup portion and the tangential initial path of the fluid providing the rotary fluid motion, the fruit is subject to drag forces, as already explained herein.

These forces are all occurring in the same sense and they combine to result in the rotation of the apricot or other object on or in the cup. Because the fluid is forced within the cup at a suitable pressure this fluid, when the product of the pressure and effective area exceeds the weight of the fruit and the drag forces exerted thereon, causes the fruit to lift off of the cup rim 51 as indicated particularly by Figs. 2 and 5 and then to turn and orient itself in a way such that it is caused to rotate about an axis which substantially coincides with the cup axis and it then tends to orient itself with its suture plane horizontal. With this occurring the fruit is then caused to be reseated on the cup rim 51 when the pressure of the fluid is reduced as the moving conveyor belt or transport mechanism 43 approaches the narrow end of the slots 83 and 84 and by the time the conveyor belt or transport mechanism 43 moves beyond the end of the slots 83 and 84 in the direction of the arrows the fruit has completely reseated itself and all fruit pieces are similarly oriented as is indicated schematically by the fruit piece shown at the extreme right of the showing of Fig. 2.

The greater the eccentricity of the oblate or prolate ellipsoid the greater will be the turning force. This turning force is proportional to the square of the angular velocity of the fruit about the axis of rotation and the tangential flow cup orients the fruit in accordance with its mass distribution. In this connection it may also be borne in mind that because the fruit pit or stone is also an ellipsoid and is of higher density than the fruit flesh itself, the forces exerted upon the pit or stone also contribute to the orientation which is a desirable factor, particularly in the case of peaches which approach a spherical form as contrasted to the more or less oblate form of the apricot.

Having now described the invention what is claimed is:

1. A fruit handling device comprising a cup having fluid-passing ports formed therein, said ports being slanted in directions to give fluid entering into the cup a tangential moment about the axis of the cup to cause a swirling motion within the cup of fluid passed through the ports, and duct means communicating with the ports for supplying fluid therethrough.

2. A fruit handling device comprising a cup having a plurality of equally spaced fluid passing slots in the wall, the slots being slanted in directions to give fluid entering into the cup therethrough a tangential moment about the axis of the cup of motion for providing a swirling fluid motion within the cup, and duct means surrounding said wall for supplying fluid at substantially like volume and pressure simultaneously through all of the wall slots.

3. A fruit-orienting device comprising a cup having a closed bottom and a sloping wall portion extending outwardly to a cup rim whereat a piece of fruit is adapted to be gravitationally supported, the rim circumference being greater than the bottom circumference, a fluid passing duct surrounding the outer cup wall, said cup wall having a plurality of rectangular slotted openings therein arranged with the long dimension of the rectangle extending toward the cup rim and each opening being in communicating relationship with the duct, each opening being so located relative to the cup wall that flow of fluid from the duct into the cup through the openings possesses a motional component tangential to the cup wall and produces a swirling fluid movement within the cup whereby the fruit is caused to rotate about an axis substantially coinciding with the axis of said cup so that the fruit will orient itself with its suture plane horizontal.

4. Fruit-handling apparatus comprising conveyor means, a plurality of spaced fruit supporting members carried on said conveyor means for movement therewith, each of said members comprising a cup adapted for supporting fruit at its outer rim, said cup having in its wall a plurality of uniformly spaced fluid entry ports so arranged relative to the cup wall that fluid entering into the cup therethrough possesses a motional component tangential to the cup wall and tends to swirl about an axis substantially corresponding to the cup axis, and fluid supply duct means associated with each port externally of the cup wall for supplying fluid to be passed within the cup.

5. A fruit-orienting device comprising an annular re-entrant supporting cup adapted for supporting drupaceous fruit at its outer rim, said re-entrant cup having a plurality of slotted openings substantially equally spaced about the cup wall and extending through the cup wall whereby fluid entering into the cup through the openings flows initially substantially tangentially of the re-entrant wall, duct means for introducing fluid under pressure simultaneously through all openings, and means for controlling the pressure and volume of fluid entering into the slotted openings from the duct means whereby the fruit is caused to rotate about an axis substantially coinciding with the axis of said cup so that the fruit will orient itself with its suture plane horizontal.

6. A fruit-handling device comprising a cup having a closed bottom and a wall portion sloping outwardly to a rim adapted for gravitationally supporting an object to be oriented, a fluid passing duct surrounding the cup wall, said cup wall having a plurality of substantially equally spaced slotted openings therein to provide communication passages between the duct and the cup interior, the wall openings being arranged so that fluid entering the cup therethrough initially moves substantially tangentially to the cup wall, and means for controlling the pressure and volume of introduced fluid into the duct at a pressure and volume to produce a swirling fluid motion within the cup with overflow fluid being adapted to leave the cup by flowing over the cup rim whereby an object adapted to be supported on the cup rim is raised from the rim and caused to rotate about an axis substantially coinciding with the cup axis and to orient itself and with reductions in the fluid pressure and volume the supported object is reseated on the cup rim oriented to correspond to the attained position at the time of fluid pressure and volume reduction.

7. In fruit-handling apparatus, conveyor means comprising a supporting platform having thereon a plurality of equally spaced cups each adapted to support a piece of fruit, having a suture plane, at the outer rim, each of said cups having a plurality of ports extending through the cup walls to supply fluid into the cup, each port being slanted at its entrance into the cup to give supplied fluid a tangential component to cause a swirling fluid movement within the cup, duct means communicating with each port externally of the cup to supply fluid into the port for passage into the cup, means adjacent to the conveyor to supply fluid to the duct means, and means to control the pressure and volume of the fluid supplied to the duct means whereby a maximum product of the pressure and volume of the supplied fluid is adapted to cause fruit supported upon the rim of the cup into which fluid is flowing at the selected pressure and volume to rise from the cup rim against the force of gravity during fluid overflow from the cup and the fruit in fluid supported position rotates about an axis substantially corresponding to the cup axis and orients itself with its suture plane horizontal and then with a reduction of the fluid pressure and volume reseats on the cup rim in the oriented position.

8. In fruit-handling apparatus an endless belt conveyor means comprising a webbing having thereon a plurality of equally spaced cups each adapted to support a piece of fruit, having a suture plane, at the outer rim, each of said cups having a plurality of ports extending through the cup walls to supply fluid into the cup, each port being slanted at its entrance into the cup to give supplied fluid a tangential component to cause a swirling fluid movement within the cup, duct means communicating with each port external to the cup to supply fluid into the port for passage into the cup, fluid passing ports extending through the belt in communication with the duct means, means adjacent to the conveyor to supply fluid to the duct means through the belt fluid passing ports, and means to control the pressure and volume of the fluid supplied to the duct means whereby a maximum product of the pressure and volume of the supplied fluid is adapted to cause fruit supported upon the rim of the cup into which fluid is flowing at the selected pressure and volume to rise from the cup rim against the force of gravity during fluid overflow from the cup and the fruit in fluid-supported positions rotates about an axis substantially corresponding to the cup axis and then orients itself with its suture plane horizontal and then with a reduction of the fluid pressure and volume reseats on the cup rim in the oriented position.

References Cited in the file of this patent

UNITED STATES PATENTS

| | | |
|---|---|---|
| 2,118,609 | Klug | May 24, 1938 |
| 2,793,734 | Lorenzen | May 28, 1957 |